(12) United States Patent
Cetin et al.

(10) Patent No.: US 8,392,343 B2
(45) Date of Patent: Mar. 5, 2013

(54) ESTIMATING PROBABILITIES OF EVENTS IN SPONSORED SEARCH USING ADAPTIVE MODELS

(75) Inventors: Ozgur Cetin, New York, NY (US); Dongwei Cao, Los Angeles, CA (US); Rukmini Iyer, Los Altos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 489 days.

(21) Appl. No.: 12/840,598

(22) Filed: Jul. 21, 2010

(65) Prior Publication Data
US 2012/0023043 A1 Jan. 26, 2012

(51) Int. Cl.
*G06F 15/18* (2006.01)
(52) U.S. Cl. .......................................... 706/12
(58) Field of Classification Search .................. None
See application file for complete search history.

(56) References Cited

U.S. PATENT DOCUMENTS

| | | | |
|---|---|---|---|
| 2005/0086018 A1* | 4/2005 | Han | 702/85 |
| 2011/0246285 A1* | 10/2011 | Ratnaparkhi et al. | 705/14.42 |

OTHER PUBLICATIONS

Shaparenko et al. "Data-Driven Text Features for Sponsored Search Click Prediction", ADKDD, 2009, pp. 46-54.*
Su et al. "Hierarchical Ensemble of Global and Local Classifiers for Face Recognition", IEEE Trans. on Image Processing, vol. 18, No. 8, 2009, pp. 1885-1896.*
Hillard et al. "Improving Ad Relevance in Sponsored Search", WSDM, 2010, pp. 261-369.*

* cited by examiner

*Primary Examiner* — Li-Wu Chang
(74) *Attorney, Agent, or Firm* — Stattler-Suh PC

(57) ABSTRACT

A machine-learning method for estimating probability of a click event in online advertising systems by computing and comparing an aggregated predictive model (a global model) and one or more data-wise sliced predictive models (local models). The method comprises receiving training data having a plurality of features stored in a feature set and constructing a global predictive model that estimates the probability of a click event for the processed feature set. Then, partitioning the global predictive model into one or more data-wise sliced training sets for training a local model from each of the data-wise slices, and then determining whether a particular local model estimates probability of click event for the feature set better than the global model. A given feature set may be collected from historical data, and may comprise a feature vector for a plurality of query-advertisement pairs and a corresponding indicator that represents a click on the advertisement.

22 Claims, 10 Drawing Sheets

ESTIMATING PROBABILITIES OF EVENTS IN SPONSORED SEARCH USING ADAPTIVE MODELS

FIELD OF THE INVENTION

The present invention is related to the field of sponsored search display advertising, and more particularly to statistical modeling of user responses to sponsored search display advertising.

BACKGROUND OF THE INVENTION

In some approaches to sponsored search modeling, a single model is used to globally predict the probability of events (e.g. clicks) based on a user, a query, and characteristics of an advertisement. However, such a single model may not be able to accurately characterize all sources of variability observed in the data. For example, "click-through rates" (CTRs) vary among queries depending upon, for example, the commercial nature of the query. Similarly, some users are a priori more likely to click on ads than other users. In some approaches, a maximum-entropy ("ME") model is used for click prediction. However, even using such a maximum-entropy model, a single model may not have enough complexity to characterize the data for maximum (or even for improved) predictive results.

Accordingly, there exists a need for improved modeling techniques for estimating probabilities of events in sponsored search display advertising.

SUMMARY OF THE INVENTION

Disclosed are machine-learning methods for estimating probability of a click event in online advertising systems by computing and comparing an aggregated predictive model (a global model) and one or more data-wise sliced predictive models (local models). The method comprises receiving training data having a plurality of features stored in a feature set and constructing a global predictive model that estimates the probability of a click event for the processed feature set. Next is partitioning the global predictive model into one or more data-wise sliced training sets for training a local model from each of the data-wise slices, and then determining whether a particular local model estimates the probability of a click event for the feature set better than the global model. A given feature set may be collected from historical data, and may comprise a feature vector for a plurality of query-advertisement pairs and a corresponding indicator that represents a user click on the advertisement. Partitioning of the training set of data into a plurality of slices comprises generating a plurality of clusters from the training data and partitioning the training set of data into a plurality of slices based on the makeup of the clusters. Other techniques partition the training set of data based on applying a hierarchy and/or applying categories to define the slices.

BRIEF DESCRIPTION OF THE DRAWINGS

Certain novel features of the invention are set forth in the appended claims. However, for purpose of explanation, several embodiments of the invention are set forth in the following figures.

DETAILED DESCRIPTION

In the following description, numerous details are set forth for purpose of explanation. However, one of ordinary skill in the art will realize that the invention may be practiced without the use of these specific details. In other instances, well-known structures and devices are shown in block diagram form in order to not obscure the description of the invention with unnecessary detail.

Overview of Networked Systems for Online Advertising

Figure 1:
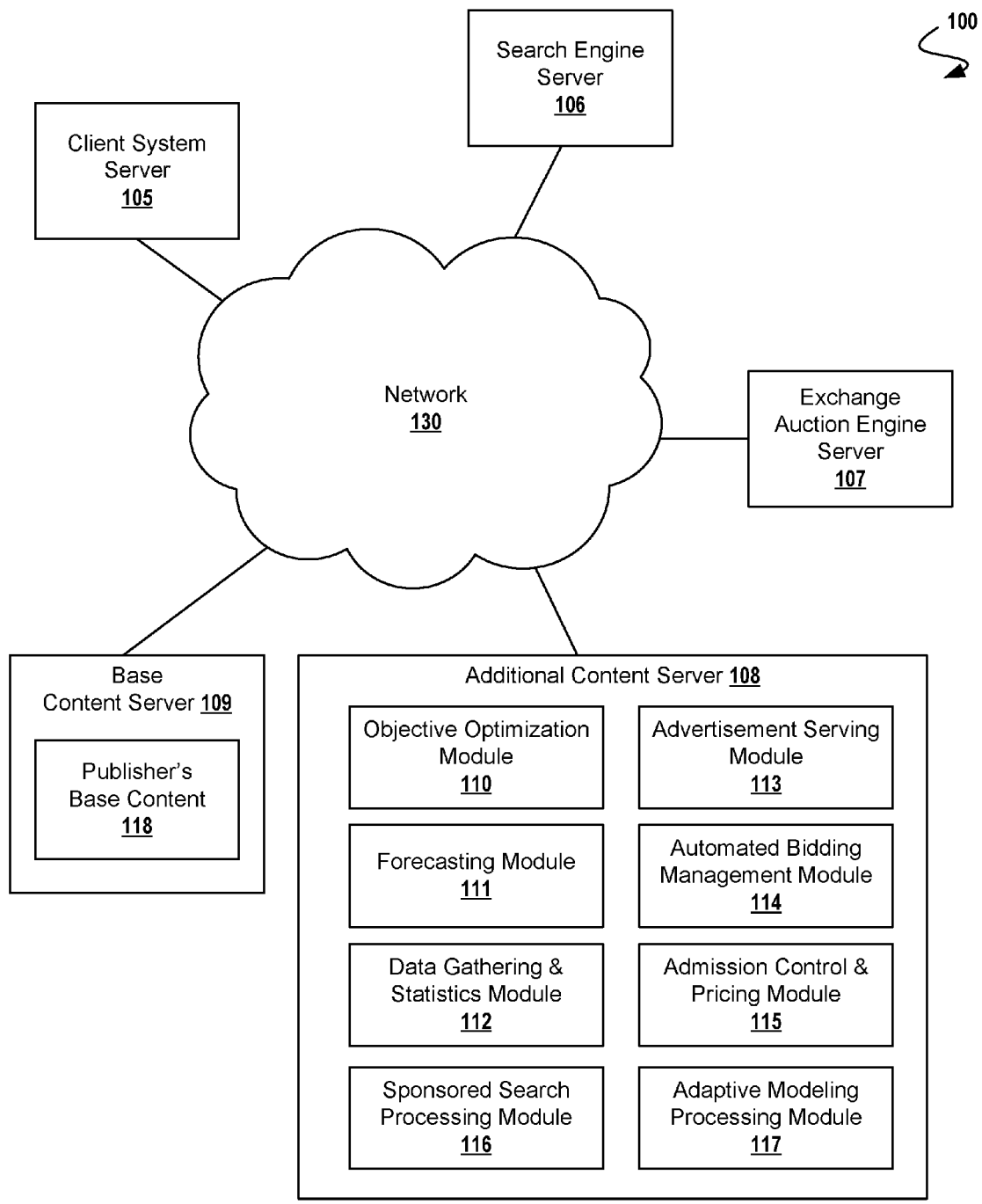
FIG. 1 depicts an advertisement server network environment, in which some embodiments operate.

FIG. 1 depicts an advertising server network environment including modules for estimating probabilities of events in sponsored search using adaptive models. In the context of internet advertising, placement of advertisements within an internet environment (e.g. environment 100 of FIG. 1) has become common. By way of a simplified description, an Internet advertiser may select a particular property (e.g. Yahoo.com/Search), and may create an advertisement such that whenever any internet user, via a client system server 105, renders the web page from the selected property, possibly using a search engine server 106, the advertisement is composited on the web page by one or more servers (e.g. a base content server 109, an additional content server 108) for delivery to a client system server 105 over a network 130. Given this generalized delivery model, and using techniques disclosed herein, sophisticated online advertising might be practiced. More particularly, an advertising campaign might include highly customized advertisements delivered to a user corresponding to highly specific target predicates, or, even in the absence of highly-specific target predicates, an advertising campaign may use techniques for estimating probabilities of events (e.g. click events) in sponsored search using adaptive models. Again referring to FIG. 1, an internet property (e.g. a publisher hosting the publisher's base content 118 on a base content server 109) might be able to measure the characteristics of visitors (which visitors may have any arbitrary interest, demographic, target predicates, or attribute) possibly using an additional content server 108 in conjunction with a data gathering and statistics module 112, and possibly also using historical data as pertains to user behavior observed at search engine server 106. Thus, an internet user's demographics and interest might be 'known' in quite some detail as pertains to a wide range of user queries, interest categories, or other demographics or attributes. Also, behaviors (e.g. the likelihood of a click or other measurable event) might be known in quite some detail, not only for a particular user, but also for a group of users corresponding to a particular slice of the available data.

In some cases, access to such a well known user, or access to such a well known group of users, might be so competitive that multiple competing advertisers might elect to bid in a market via an exchange auction engine server 107 in order to win the most prominent spot on a web page delivered to the user.

In some embodiments, the environment 100 might host a variety of modules to serve management and control operations (e.g. an objective optimization module 110, a forecasting module 111, a data gathering and statistics module 112, an advertisement serving module 113, an automated bidding management module 114, an admission control and pricing module 115, a sponsored search processing module 116, an adaptive modeling processing module 117, etc) pertinent to serving advertisements to users. In particular, the modules, network links, algorithms, assignment techniques, serving policies, and data structures embodied within the environment 100 might be specialized so as to perform a particular function or group of functions reliably while observing capacity and performance requirements. For example, a search engine server 106, possibly in conjunction with a sponsored search processing module 116 and an adaptive modeling processing module 117, might be employed to implement an approach for estimating probabilities of events in sponsored search using adaptive models.

Overview of Approaches for Estimating Probabilities of Events in Sponsored Search Using Adaptive Models As mentioned above, some approaches to sponsored search modeling might employ a single model used to globally predict the probability of a click based on a user, a query, and characteristics of an advertiser. However, as observed, a single 'global' model may not be able to accurately characterize all sources of variability observed in the data. In some embodiments as disclosed herein, a sponsored search system might use multiple models. As an example, while a global model might be used as a predictor over a wide range of situations, it is reasonable (and further disclosed herein) to define and employ multiple 'local' models, where the local models are adapted to a certain subset (e.g. a slice, a classification, a dimension, a category, etc) of the data. In some embodiments, the local models are constructed based on any subset of slices, classifications, or dimensions of the groups of queries (e.g. software related, finance related, travel related, etc) or the groups of users (e.g. low and high clickers) as derived from the global model. Disclosed herein are techniques to adapt model scores against bids (squashing) for a particular local model, as well as techniques to adapt page placement thresholds for a particular local model. Moreover, given such a plurality of adaptable local models, it is algorithmically possible (and disclosed herein) to adapt various parameters for each local model separately, thus optimizing a particular local model for its predictive performance in a particular context (e.g. using a particular slice, classification, dimension, category, etc).

Estimating Probabilities of Click Events in Sponsored Search Using Adaptive Models One objective of the techniques disclosed herein is to improve the accuracy of the click-through rate (CTR) prediction by using one or more local models that are sliced to pertain to substantial portions of the traffic (e.g. queries in a sponsored search system). The predictive modeling techniques as shown herein increase CTR and click yield, as well as significantly improve revenue and page placement.

The adaptive modeling system disclosed herein implements the following utilities. First is to determine what kinds of query subsets a particular adaptive modeling technique may improve. For example, some adaptive modeling techniques may not be effective for subsets with small amounts of training data. Second is to determine what the best strategy may be to train the local models. From both computational efficiency and modeling accuracy points of view, the initialization using a global model may be better than cold-start initialization (e.g. flat initialization). Third is to determine whether there may be any benefit to combining the predictions of local and global models. A particular combination may be robust against overfitting, especially in cases of smaller query subsets.

In some embodiments disclosed herein, the adaptive modeling uses multiple local models, where each model is adapted to a certain subset of the data. For the purpose of local modeling, the subsets of the data may be obtained based on a hard partitioning of queries, such as by classification into categories of an ontology, or the subsets of the data may be obtained based an unsupervised partitioning using one or more automatic clustering methods.

The automatic clustering methods may optimize the partitioning for model estimation purposes. In some embodiments, the adaptive modeling system uses predetermined clustering of queries while, in some other embodiments, it uses automatic clustering methods for CTR modeling. In yet other embodiments, instead of employing a two-stage process of performing partitioning and followed by performing model training, the process is combined in a mixture modeling approach, where a mixture of models are directly fitted to the data.

Various adaptive modeling techniques emphasize slicing by query slices, since there are relatively straightforward methods for partitioning the queries into homogenous query slice subsets. However, modeling techniques for slicing are not limited only to queries; modeling techniques may also include users, advertisers, and/or advertisements, and/or any other available data for that matter.

The proposed adaptive modeling approach may be considered as follows: A model is denoted by f. The whole training data set may be denoted by D, and the global model may be trained using D by f. The model f is trained using all of D. A data set D is partitioned into several pair-wise disjoint clusters and used to train a model, called the local model, for each cluster. More specifically, these local models may be built using the following two steps.

Step 1. Partition D into pair-wise disjoint clusters. Assuming there are k clusters, the resulting clusters are defined as $D_i$, i=0, . . . , k−1

Step 2. For i=0, . . . , k−1, $D_i$ is used to build a model, $f_i$, for the i-th cluster. The weight vector $w_i$ of $f_i$ is obtained by maximizing $G(w|\lambda, D_i)$ with respect to w ($G(w|\lambda, D_i)$ defined below).

Still more specifically, using a pair-wise disjoint partitioning of a closed query set into k subsets, the subsets $D_1$, $D_2$, . . . , $D_k$ from D are extracted using the query (not every example in D might be covered by this partition). For each subset, a local model, $f_i$, is trained on subset $D_i$ ($f_i$ may be of the same form as the global model). Although feature extraction may be tailored to each query subset, in some embodiments the same feature set for the local and global models may be used. In such a case, the parameter vectors may be deemed as being comparable across the local and global models, and the training of the local models may be initialized from the global model. This training technique might be expeditious as compared to other methods of initialization. In some embodiments, for each query, the adaptive modeling system may first identify the partition to which the query belongs, and may then use the corresponding local model to predict its probability of click. For the queries not covered by any of the local models, the global model may be used.

How to partition the training data set D may not be under a strict restriction. Thus, for some clusters, the local model may perform as well as the global model. In other embodiments, the local models and the global model may be combined. More specifically, either the global or the local model may be used for a cluster by comparing their respective performance. This may ensure that the final models will perform no worse than the global model. In yet other embodiments, the local model may outperform the global model over some clusters, thus the combination of the local models and global model may outperform the global model taken alone.

In some embodiments, the use of multiple models may be similar to that of mixture models in machine learning. In some embodiments of the adaptive modeling system of the present invention, the mixture components may correspond to a hard partitioning of the queries. In addition to improving prediction accuracy, local modeling may be also computationally advantageous, since the local models may be trained in parallel. Finally, the local models may be defined to be relatively more complex, since each local model may be trained on only a fraction of the full data set.

Predictive/Adaptive Modeling Approach

The following description sets forth various embodiments for estimating probabilities of events in sponsored search using adaptive models. In some embodiments, the partitioning may correspond to some human-recognizable semantic classes, or the partitioning may come from an automatic clustering technique, as discussed above. In addition, a mixture modeling approach, where the mixtures are over the click models, is described.

Background: Maximum-Entropy Training

In some embodiments, the modeling system disclosed herein uses maximum-entropy (ME) model training. For the purpose of model adaptation, an overview of ME model training is set forth below. The ME model training optimizes a penalized likelihood function with respect to the ME weights w:

$$J(w)=LL(w;D)+\log p(w)$$

where, $LL(w; D)$ is the log-likelihood of the data, and $p(w)$ is a prior over the weights, that is, Gaussian with mean $\mu_0$ and covariance matrix $\Sigma_0$:

$$w \sim N(\mu_0, \Sigma_0)$$

At the end of the training procedure, that prior is turned into a posterior distribution, $p(w|D)$, with some mean, $\mu$, and covariance matrix, $\Sigma$:

$$w|D \sim N(\mu, \Sigma)$$

The posterior mean, $\mu$, is used as the estimated weights for future predictions, while $\Sigma$ may be useful for confidence prediction and adaption. The default prior is zero-mean and has a diagonal covariance matrix. Regardless of the prior, the optimization procedure is started from some initial set of weights $w_0$, which are possibly initially set to zero.

Adaptive Modeling with Hard Clusters

Consider a pairwise disjoint partitioning of a closed query set into k subsets, where a local model, $f_i$ is trained using $D_i$. For this embodiment, each local model uses the same feature set as the global set, so the estimated weights between local and global models are commensurate. For estimating local models, there are a number of alternatives depending on the degree to which the local models make use of the global model f Simple Local Modeling In this approach, the local model, $f_i$ is trained the same way the global model is trained (flat initialization with a $N(0,\sigma^2 \times I)$ prior), using only the local data $D_i$. This approach may be susceptible to overfitting if $D_i$ is small.

Initialization from the Global Model

This is similar to the approach of simple local modeling, but instead of flat initialization, the local model training is initialized from the global model. In addition to providing a better initialization point, the use of a global model for initialization provides a truly adaptive framework. With each iteration of the ME training on the local data set, the global model is adapted to the local data. Therefore, the number of adaptation iterations may be an important parameter. While too few iterations may not provide enough adaptation, too many iterations may trend toward deviating too far from the global model. This deviation may be a problem if the amount of local data is small.

Global Model as Prior

This approach is similar to the initialization from the global model, however the number of adaptation iterations is less crucial. In some embodiments, and using this approach in the adaptive modeling system of the present invention, the global model is used as a prior for the local models. Using the Bayesian inference as a basis for this approach, the posterior probability over parameters is $p(w|D_a)$ based on some data set $D_a$. In these embodiments, for some new data set $D_b$, the current posterior distribution $p(w|D_a)$ may be used as prior to update to the full posterior $p(w|D_a, D_b)$, i.e., $$p(w|D_b) \sim p(D_b|w) \times p(w|D_a)$$

According to the present invention, in the ME training context for local model i, the data sets $D_a$ and $D_b$ should ideally correspond to $D \backslash D_i$ (all data except the local data $D_i$) and $D_i$, respectively. However, $D_i$ is usually a small fraction of D (may be less than 5% in the adaptive modeling system), so the global posterior distribution $p(w|D)$ may be substituted for $p(w|D \backslash D_i)$ for computational efficiency. The local ME objective function then becomes:

$$J_i(w)=LL(w;D_i)+\lambda \times \log p(w|D)$$

where $\lambda$ is a free parameter to trade-off adaptation versus overfitting. For $\lambda=0$, this approach will completely adapt to the local data, whereas for a very large $\lambda$, the adapted model will deviate little from the global model. For example, whereas the pure Bayesian approach described above corresponds to $\lambda=1$, the choice $\lambda=1$ may not be optimal in the adaptive modeling system because the posterior distributions are only approximate. In the adaptive modeling system, (1) the posterior first may be Gaussian, and (2) a diagonal covariance matrix may be used in that posterior distribution. Due to the computational reasons, even this diagonal estimate of a covariance matrix may be approximate. In general, it is an open question to find accurate posterior distributions with full but sparsely parameterized posterior distributions. Thus, the adaptive modeling system attempts to find optimal $\lambda$ for each local data set, for example, based on the relative magnitudes of the log-likelihood $LL(w; D_i)$ and prior $\log p(w)$ terms.

Combination of Local and Global Models

Regardless of how the local model is estimated, both the global model and local model may be used for the final probability of click prediction. For this purpose, the probabilities of the local and global models may be combined using:

Linear interpolation: $p(C) = \alpha \times p_{glob}(C) + (1-\alpha) p_{local}(C)$
Minimum combination: $p(C) = \min(p_{glob}(C), p_{local}(C))$
Maximum combination: $p(C) = \max(p_{glob}(C), p_{local}(C))$ In linear interpolation, $\alpha$ is a free parameter, but the uniform weighting is effective in the modeling system of the present invention. In minimum combination, a high probability of click is output only if the predictions of the both models are high. Thus, the minimum combination may be more conservative; it is analogous to a logical AND gate. On the other hand, the maximum combination outputs a high probability of click if any of the models gives a high probability of click; it is analogous to a logical OR gate. For the purpose of click prediction, the low-recall/high-precision region seems to be more important than the high-recall/low-precision region, and the minimum combination may perform better in some embodiments of the present invention.

In some embodiments, the adaptive modeling system attempts to combine the local and global models in such a way that the resulting combined model is better than, or at least similar to, the global models for most categories. In other words, by using the modeling system as described herein, the combined model is expected to perform better than the global model when the local model is better than the global model, while performing similarly to the global model when the local model is worse than the global model. In such a way, the combination may provide some guard against overfitting.

Mixture Modeling

In the mixture modeling approach of the present invention, instead of building separate local models, a joint mixture model is built for all of the data:

$$p(c) = \Sigma_z p(z) p(c|z)$$

where $p(z)$ denotes the probability of the z-th mixture component, and $p(c|z)$ denotes the corresponding probability as predicted by the click model (all probabilities are conditioned query, ad, etc). Each $p(c|z)$ is a binary ME model, while $p(z)$ may be a multi-class ME model. As a generative model, this model may be thought of as first picking a mixture component according to the distribution $p(z)$, and then generating a click event using the probability model $p(c|z)$. It is not necessarily determined what the underlying z's are during training or testing as they are mainly a modeling tool and need to be integrated out as shown in the above formula. Testing is straightforward, while training requires some modifications, such as when adjusting the parameters of the component model $p(c|z)$, a given example is assigned to the z-th component according to the posterior probability $p(z|c)$. Thus, it is possible that each example contributes to multiple components during training.

Notice that if the probability distribution $p(z)$ is 0/1 degenerate, then the mixture approach would reduce to the hard partitioning of the data. The mixture models may better fit to the data as the assignment of the examples to different classes is not strict, and all of the data is effectively utilized when estimating the parameters of each component. In addition, mixture modeling allows for optimization of clustering specifically for click prediction, (as contrasted with optimization of clustering for some other auxiliary task, such as modeling the marginal distribution of the ME features).

Figure 2:
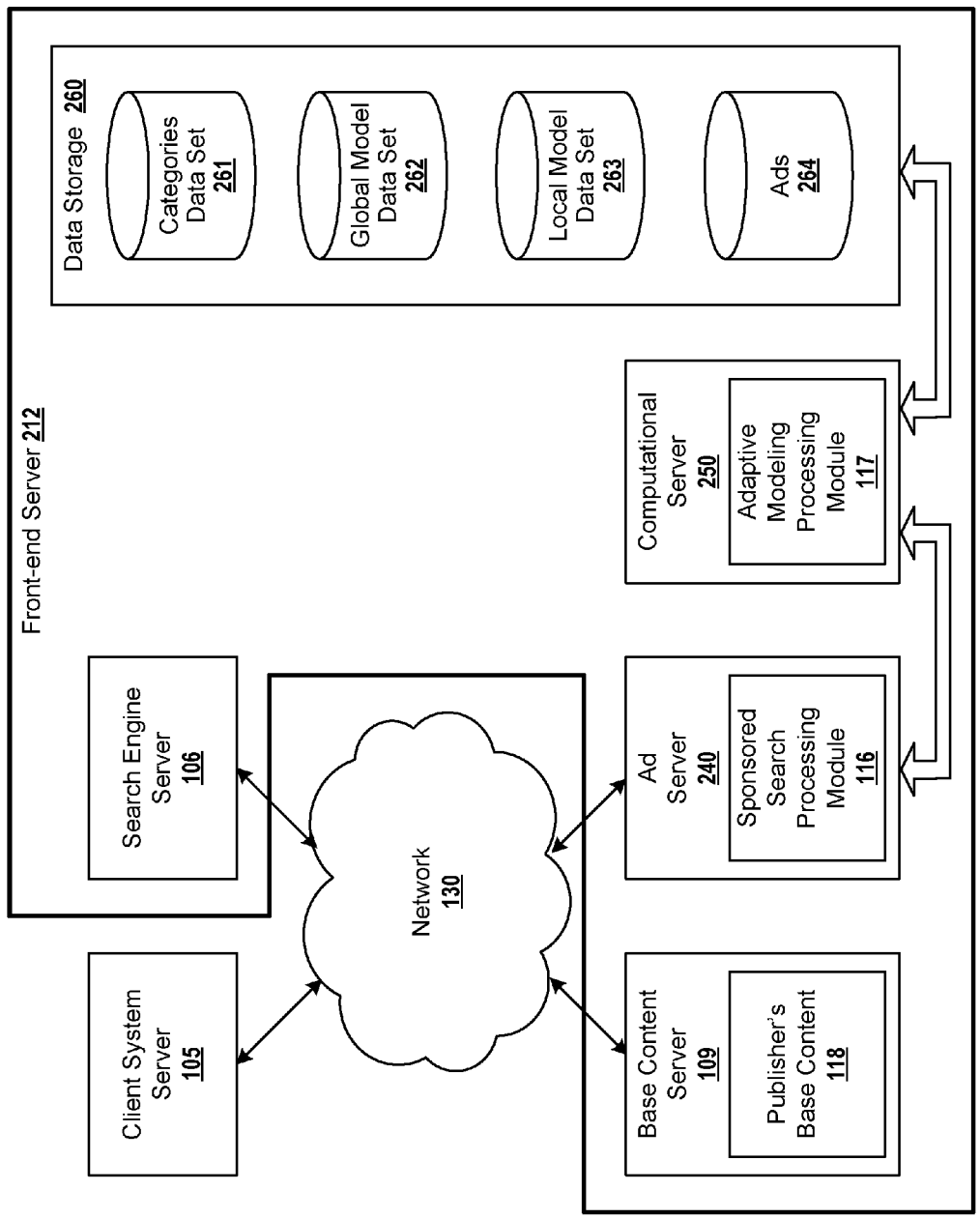
FIG. 2 depicts a block diagram illustrating one embodiment of a system for estimating probabilities of events in sponsored search using adaptive models using local models, according to one embodiment.

System for Estimating Probabilities of Events in Sponsored Search Using Adaptive Models FIG. 2 depicts a block diagram illustrating one embodiment of a system for estimating probabilities of events in sponsored search using adaptive models. A device as disclosed herein may be hardware, software, or a combination thereof. A device may sometimes be referred to as an apparatus. Each device is configured to carry out one or more steps in a method for estimating probabilities of events in sponsored search using adaptive models.

The system 200 for estimating probabilities of events in sponsored search using adaptive models may include a client system server 105, a base content server 109, and/or an additional content server (e.g. ad server 240), and/or a computational server 250, any or all of which may be connected to a network 130 (e.g. internet, intranet, subnet, etc), and any or all of which may be connected to data storage 260. The system 200 might be further configured to select additional content (e.g. advertisements) to be sent to a user/client system, possibly together with related base content (e.g. base content for an auto dealership might include additional content in the form of an advertisement for a featured automobile). The front-end server(s) 212 may also be referred to as a customized web server. The network 130 may be any combination of networks including, without limitation, the web (i.e. the internet), a local area network, a wide area network, a wireless network, a cellular network, etc.

More specifically, the client system server 105 is configured to request and receive content (e.g. in the form of web pages) from the front-end server(s) 212 where such content may include base content (e.g. a requested web page, search page results, etc) and/or additional content (advertisements, an advertising campaign control panel, a dashboard, a keyword input screen device, etc).

In other embodiments, the search engine server 106 is configured to receive a search query from the client system server 105, perform the search query (comprising one or more terms), attach the search query terms to a search results web page (for example, within the uniform resource locator address), and serve the search results web page to the client system server 105, the search results web page typically comprising search results in the form of one or more hyperlinks to one or more landing web pages; plus an area for sponsored search advertisements.

The computational server 250 may include an adaptive modeling processing module 117 which, in conjunction with the data storage 260, is used for constructing adaptive models to estimate, for example, the probability of events (e.g. a click by a user on an ad) given a model.

More particularly, such a system 200 may be used for constructing and training local models for estimating event probabilities in a sponsored search.

Local Model Training

Figure 3:
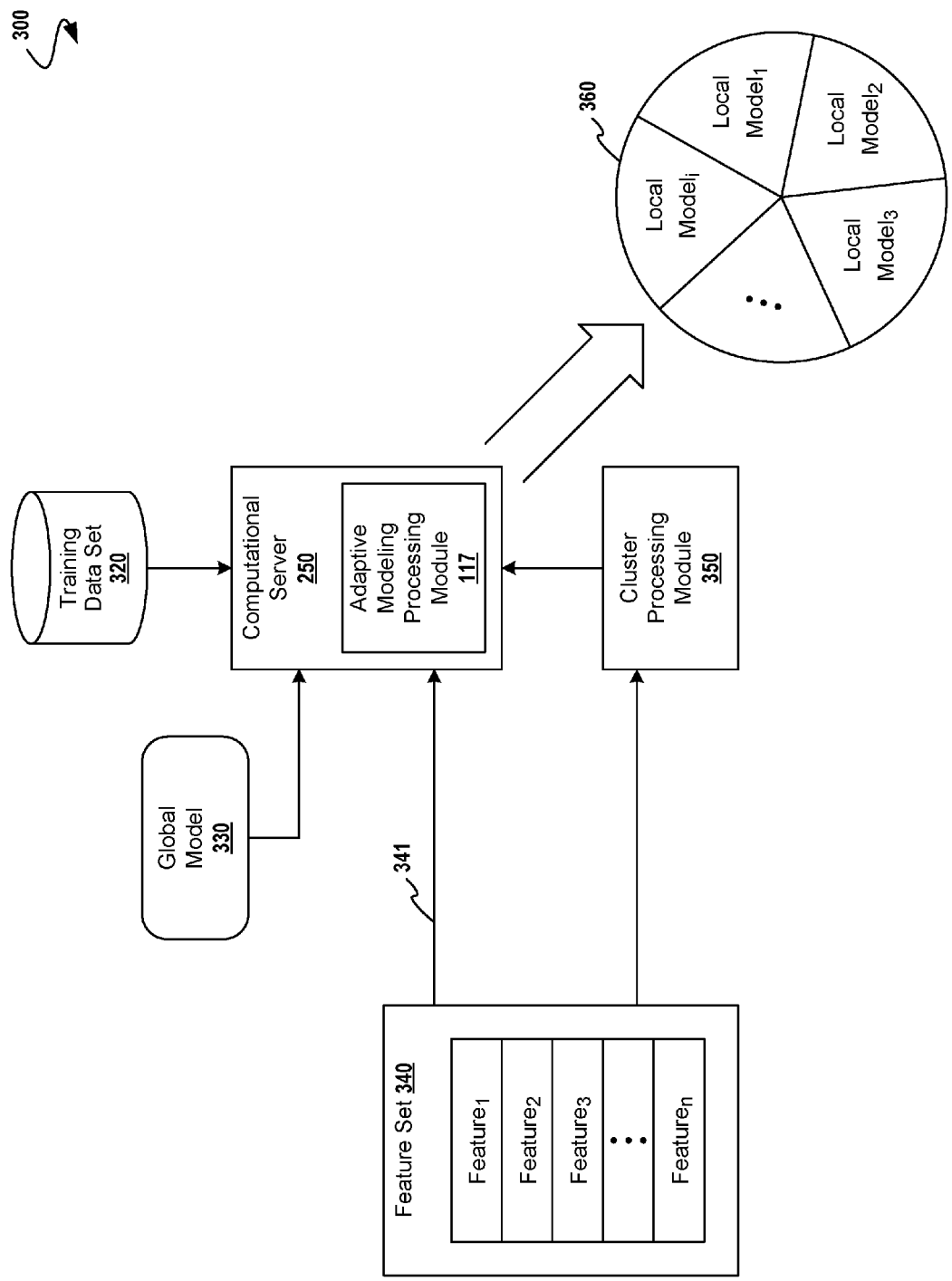
FIG. 3 depicts a block diagram illustrating a process of estimating probabilities of events in sponsored search using adaptive models using local models, according to one embodiment.

FIG. 3 depicts a block diagram illustrating a process of estimating probabilities of events in sponsored search using adaptive models. As illustrated in FIG. 3, system 300 includes an adaptive modeling processing module 117 within a computational server 250, which computational server may access data storage 260 (see system 200). Specific contents and uses of data within data storage 260 are discussed in detail below. Data storage contains various kinds/types of data sets such as, for example, an enumeration of categories, possibly in a categorization data set 261, a global model data set 262, a local model data set 263, and/or ads 264. The adaptive modeling processing module 117 is also coupled to a cluster processing module 350, which might be implemented within a computational server 250. As shown in FIG. 3, the modules (e.g. adaptive modeling processing module 117, cluster processing module 350) may be software or hardware or a combination of software and hardware. As shown, the cluster processing module 350 is coupled to the feature set 340 and adaptive modeling processing module 117, and is configured to partition the training data set 320 and its associated feature sets 340.

In one embodiment, the training data set 320 may be one of the data sets stored in the data storage 260, including a categorization data set 261 associated with queries and ads, alone or associated with queries. The training data set 320 comprises a plurality of features in a feature set 340. The feature set 340 consists of n numbers of features such as, for example, $Feature_1$, $Feature_2$, $Feature_3$, ..., $Feature_n$.

The adaptive modeling processing module 117 retrieves various data/information from the data storage 260. For instance, the adaptive modeling processing module 117 retrieves a training data set 320 and its associated feature set 340 (e.g. $Feature_1$, $Feature_2$, $Feature_3$, ..., $Feature_n$), indirectly (or possibly directly) from the data storage 260. The adaptive modeling processing module 117 also retrieves a global model 330 from the global model data set 262 in the data storage 260. The collected data of the training data set is partitioned into slices by the cluster processing module 350. In some embodiments, the adaptive modeling processing module 117 receives a training data set with the associated feature set without going through a partitioning process by the cluster processing module 350 before being transmitted for processing to train local models (see path 341). In other embodiments, the training data set with the feature set are first partitioned into slices in the adaptive modeling processing by the cluster processing module 350 before being transmitted for processing to train the local models. The partitioned slices of the trained data set are then transmitted to a local model data set 360 to train the local models. As shown, the local model data set 360 includes i numbers of local models such as, for example, $Local Model_1$, $Local Model_2$, $Local Model_3$, ..., $Local Model_i$. Each $Local Model_i$ is trained using each subset trained data $D_n$ and the feature set $Feature_n$. Any one or more local models from the local model data set 360 may be stored in storage areas within a data storage 260.

A Process for Selecting an Adaptive Model

Figure 4:
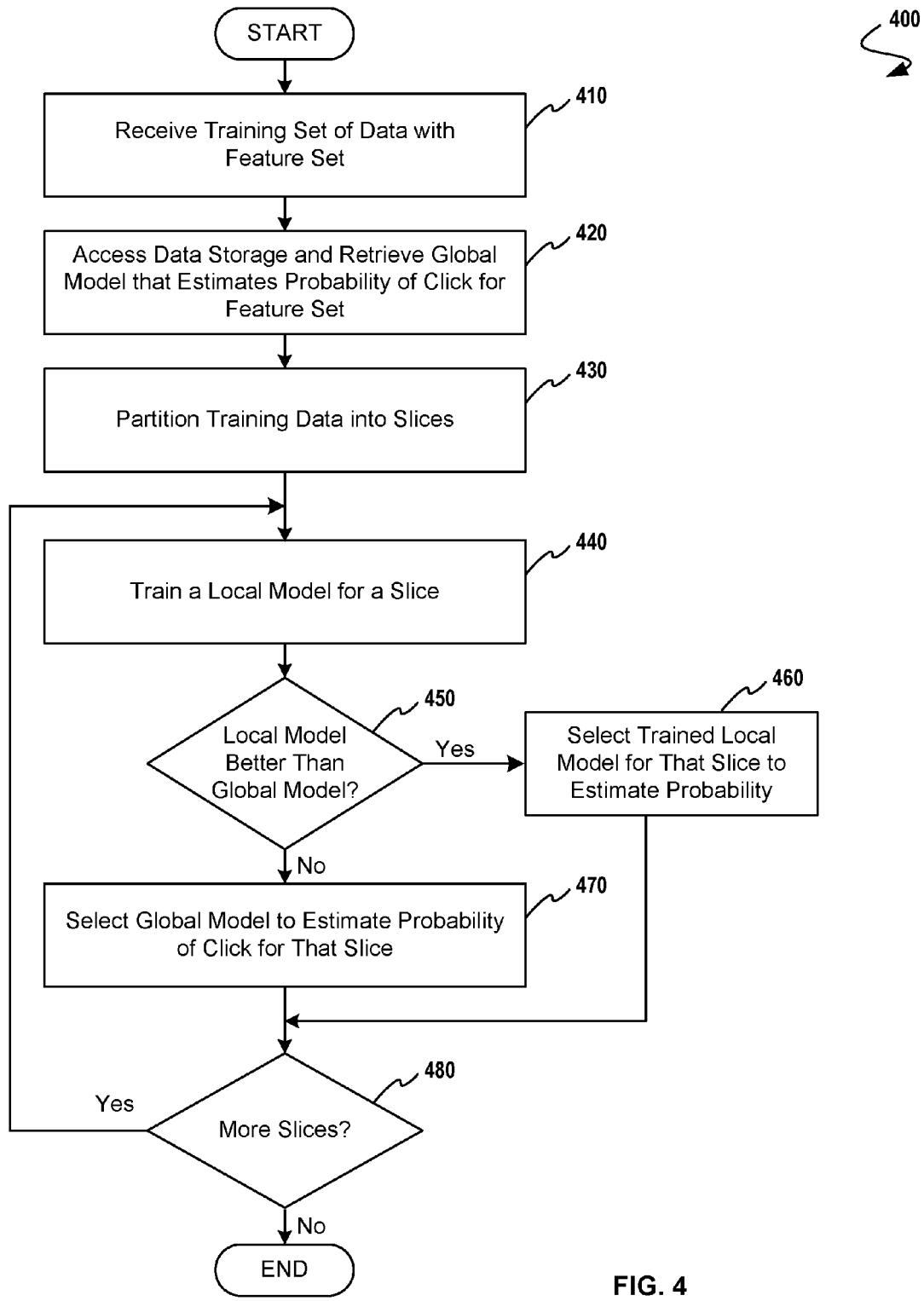
FIG. 4 depicts a flow diagram illustrating a process for selecting an adaptive model in estimating probability of click for the data, according to one embodiment.

FIG. 4 depicts a flow diagram illustrating a process for selecting an adaptive model in estimating probability of click for the data. As shown in FIG. 4, the adaptive modeling method starts in processing block 410. At processing block 410, the system receives a training data set 320 (possibly from the data storage 260), comprising at least one feature selected from a feature set 340. The training set of data may include, for example, queries input by a user or users, advertiser entities, and/or advertisements selected for the user query under the sponsored search system.

Then in processing block 420, the system accesses the (adaptive modeling) data storage 260 and retrieves a global model 330 from the global model data set 262 for the training data set 320. The retrieved global model 330 is processed with the training data set 320 associated with the feature set 340 to estimate probability of click for the feature set 340.

In processing block 430, the system partitions the training data into a plurality of slices using the cluster processing module 350, which is possibly implemented using the computational server(s) 250 along with the adaptive modeling processing module 117. Partitioning is necessary to compare the global model and local model for each subset of the training data set to determine which of the global model and the local model is better in estimating probability of click for each subset. There are many methods for partitioning of data into slices, such as hard partitioning or automatic partitioning, as discussed above. Partitioned slices comprise n numbers of subset of the training data set such as, for example, $D_1$, $D_2$, $D_3$, ..., $D_n$. In some embodiments, partitioning is performed based on categories of subject matter for the query-advertisement pairs.

The system then proceeds to processing block 440. In processing block 440, the partitioned trained data set associated with the feature set is transmitted to the local model data set 360 for training. In this embodiment, the local model is trained for each one of the slices of the training data set that the local models have been partitioned into, for example, starting with a subset $D_1$. The trained $Local Model_1$ for the subset $D_1$ of the training data set is then processed to estimate probability of click for the training data set.

In processing block 450, the system compares the estimates of probability of click between the global model and the trained $Local Model_1$ for the subset $D_1$ to determine whether the trained $Local Model_1$ is better than the global model in estimating probability of click for $D_1$. When the trained $Local Model_1$ is better than the global model, it proceeds to step 460, and the trained local model, is selected to estimate probability of click for $D_1$. On the other hand, when the system determines that the global model is better than the trained $Local Model_1$, it proceeds to processing block 470 and the global model is selected to estimate probability of click for $D_1$.

Once either processing block 460 or processing block 470 is complete for $D_1$, the system determines whether there are more subsets (e.g. slices) of the trained data set that have not been used to train local models. If it is determined that there are, the system goes back to processing block 440 and repeats steps between 440 and 480 for the remainders of the n subsets of the training data set until all of the n numbers of the subsets have been used to train local models, and a model for each subset is selected between the global model and the trained local model to be the better model to estimate probability of click. The better model between the global model and the trained local model is determined for each subset of the training data set.

Techniques for Adaptive Modeling of Event Prediction in Sponsored Search

As discussed earlier, a central problem in sponsored search is to estimate the probability of click (i.e. how likely a user will click on an ad given a query). Such an estimate is used, possibly together with the bid, in ranking the candidate ads for each query. A reliable probability estimate enables the sponsored search system to serve advertisements or messages that improve revenue by increasing the click-through rate. In some embodiments, the technique focuses on queries because score calibration is eliminated when using the same model and ranking a candidate set for a query. Various methods exist for partitioning the queries into subsets.

Weight Modeling

As discussed above, for click prediction, each query-advertisement pair is represented by a feature vector x and a binary indicatory (e.g. 1 for a click and 0 for not-a-click). A training data set D, consisting of historical (x, y) pairs may be extracted from sponsored search logs. The adaptive modeling system may then build a model for p(y|x) using D. The logistic regression in statistics may be used to model p(y|x) as:

$$p(y = 1 \mid x) = \frac{1}{1 + \exp(-w^T x)}$$

In some embodiments, the weight vector, w, is estimated using maximum entropy (ME) models. Specifically, the technique maximizes a regularized likelihood function defined over D using a Gaussian prior over w. The weight vector, w, is obtained by maximizing the following objective function with respect to w:

$$G(w \mid \lambda, D) = \sum_{(x_j, y_j) \in D} \log\left(\frac{1}{1 + \exp(-y_j w^T x_j)}\right) - \lambda w^T w$$

The objective function, $G(w \mid \lambda, D)$, is parameterized by the regularization coefficient, $\lambda$, whose value is chosen by experiment and the training data set D. In some sponsored search modeling techniques, a single model, f, called the global model as discussed above, is used to predict the probability of click for every user, query, and advertiser. The weight vector of the model f is trained using all of D by maximizing $G(w \mid \lambda, D)$ with respect to w.

Hidden Variable Models

In particular, modifications may be made to the training system (e.g. a ME trainer) allowing for arbitrary parameter priors that may be useful for other training tasks. Also, the mixture modeling framework allows identification of hidden-variable models, for example, for building position-factored ME models based on seen/not-seen normalization. Still more, the automatic clustering methods based on mixture-of-Gaussian feature models may be used for direct handling of missing features by either integrating them out, or completing them based on the mixture-of-Gaussian feature models.

Using Partitioning, Clustering, and Categories

When using hard partitioning for the purpose of click modeling, it may be advantageous that the partitions selected are homogenous. In some embodiments, the modeling system initially uses existing query partitions. For purposes of proving the techniques disclosed herein, three sets of query clusters were evaluated using: (1) the categorization of the websites into topical categories; (2) micromarket categories; and (3) the minimum reserve pricing (MRP) categories, where a query is clustered according to the most popular account categories for the ads displayed for that query.

For local modeling, some embodiments use the aforementioned micromarket categories, which are the subsets of queries with minimal advertiser spending leakage across different subsets. The adaptive modeling system may be configured to select the top-most revenue generating micromarkets (the relative coverage of queries, clicks, views, and revenue for each micromarket are shown in Table 1). The modeling system compares models according to their precision and recall rates for clicks in the testing data.

The adaptive modeling system demonstrates four models: (1) the global model, $M_G$; (2) the local model trained with flat initialization, $ML_0$; (3) the local model initialized using the parameters of the global model, $ML_G$; and (4) the combination model $M_C$, whose prediction is the uniform average of those of $M_G$ and $ML_G$.

Table 1 compares these four models in terms of the area under the precision-recall curve (AUC), thus a higher AUC value means better performance. As shown and described, a local model is tested on the corresponding selected test data only. The last row of Table 1 shows the average rank over the selected query slices for the four models. For each query slice, the adaptive modeling techniques sort the AUCs in decreasing order so that the model with the highest AUC receives a rank of 1, the next model receives a rank of 2, and so on. The average rank gives a cumulative performance score over all query slices.

TABLE 1

Comparison of local and global models

| Query Slice | Relative Coverage (%) | | | | Precision-Recall Area Under Curve | | | |
|---|---|---|---|---|---|---|---|---|
| | Unique Queries | Clicks | Views | Revenue | $ML_0$ | $ML_G$ | $M_G$ | $M_C$ |
| 00139 | 0.15 | 2.34 | 2.07 | 6.09 | 0.180 | 0.181 | 0.173 | 0.180 |
| 01871 | 0.30 | 3.67 | 2.68 | 4.04 | 0.159 | 0.161 | 0.153 | 0.158 |
| 00030 | 0.05 | 0.61 | 0.56 | 3.80 | 0.208 | 0.207 | 0.206 | 0.212 |
| 01668 | 0.33 | 3.90 | 2.97 | 3.69 | 0.176 | 0.176 | 0.175 | 0.176 |
| 00341 | 0.47 | 2.16 | 3.43 | 2.71 | 0.148 | 0.146 | 0.147 | 0.149 |
| 00257 | 0.22 | 1.66 | 1.74 | 2.57 | 0.248 | 0.247 | 0.249 | 0.249 |
| 00378 | 0.20 | 0.82 | 1.85 | 2.06 | 0.137 | 0.137 | 0.141 | 0.141 |
| 00913 | 0.16 | 1.47 | 1.75 | 1.95 | 0.187 | 0.187 | 0.186 | 0.189 |
| 00318 | 0.09 | 2.06 | 1.58 | 1.91 | 0.171 | 0.170 | 0.167 | 0.170 |
| 01288 | 0.11 | 1.23 | 1.07 | 1.40 | 0.182 | 0.181 | 0.180 | 0.184 |
| Average Rank | | | | | 2.25 | 2.65 | 3.4 | 1.7 |

The adaptive modeling system disclosed herein yielded the results as next discussed based on Table 1. First, while the AUC differences between the local and global models are generally small, the local models seem to be useful in slices with the most data (00139 and 01871). Second, the tests performed did not exhibit any sizeable AUC difference between initializing the local models using a flat model versus initializing from the global model. However, the local model converges much faster when initialized from the global model. Third, for each query slice, the model combination reflects robust to bad performance of the local or global model and, thus, the resulting performance is close to that of the best of the local and global models. In some cases, the model combination may be the most feasible method for incorporating the adaptive modeling techniques.

In some embodiments where the adaptive modeling system disclosed herein uses the micromarket clusters, there are significant improvements in prediction performance using the largest of the micromarkets (e.g. software and loans). However, in cases when there are too many small micromarkets to make a significant overall impact by using a reasonable number of micromarkets, the focus of the adaptive modeling techniques shifts to the MRP categories, which provide sizeable traffic using a handful of categories. The results using only the MRP categories are presented below, where conclusions from using the spend management are also similar.

Spend management categories: Some of the most significant micromarkets out of about the 10,000 available are listed in Table 2.

TABLE 2

| Slice | Views % |
|---|---|
| 00139 (loans) | 2.07 |
| 01871 (software) | 2.68 |
| 00030 | 0.56 |
| 01668 | 2.97 |
| 00341 | 3.43 |
| 00257 | 1.74 |
| 00378 | 1.85 |
| 00913 | 1.75 |
| 00318 | 1.58 |
| 01288 | 1.07 |

MRP categories: The full list of MRP categories are listed in Table 3.

TABLE 3

| Slice | Views % |
| --- | --- |
| Travel | 5.64 |
| Health | 4.13 |
| Automotive | 3.99 |
| Apparel | 3.92 |
| Computing | 3.74 |
| Telecom | 3.69 |
| Financial | 3.46 |
| Education | 3.36 |
| Books | 3.10 |
| Entertainment | 2.59 |
| Electronics | 2.56 |
| Home | 2.41 |
| Professional | 2.02 |
| Toys | 1.79 |
| Adult | 1.60 |
| Sporting | 1.49 |
| Real Estate | 1.33 |
| Flower | 0.96 |
| Reference | 0.61 |
| Consumer Packaged Goods | 0.32 |
| Gambling | 0.10 |

Figure 5:
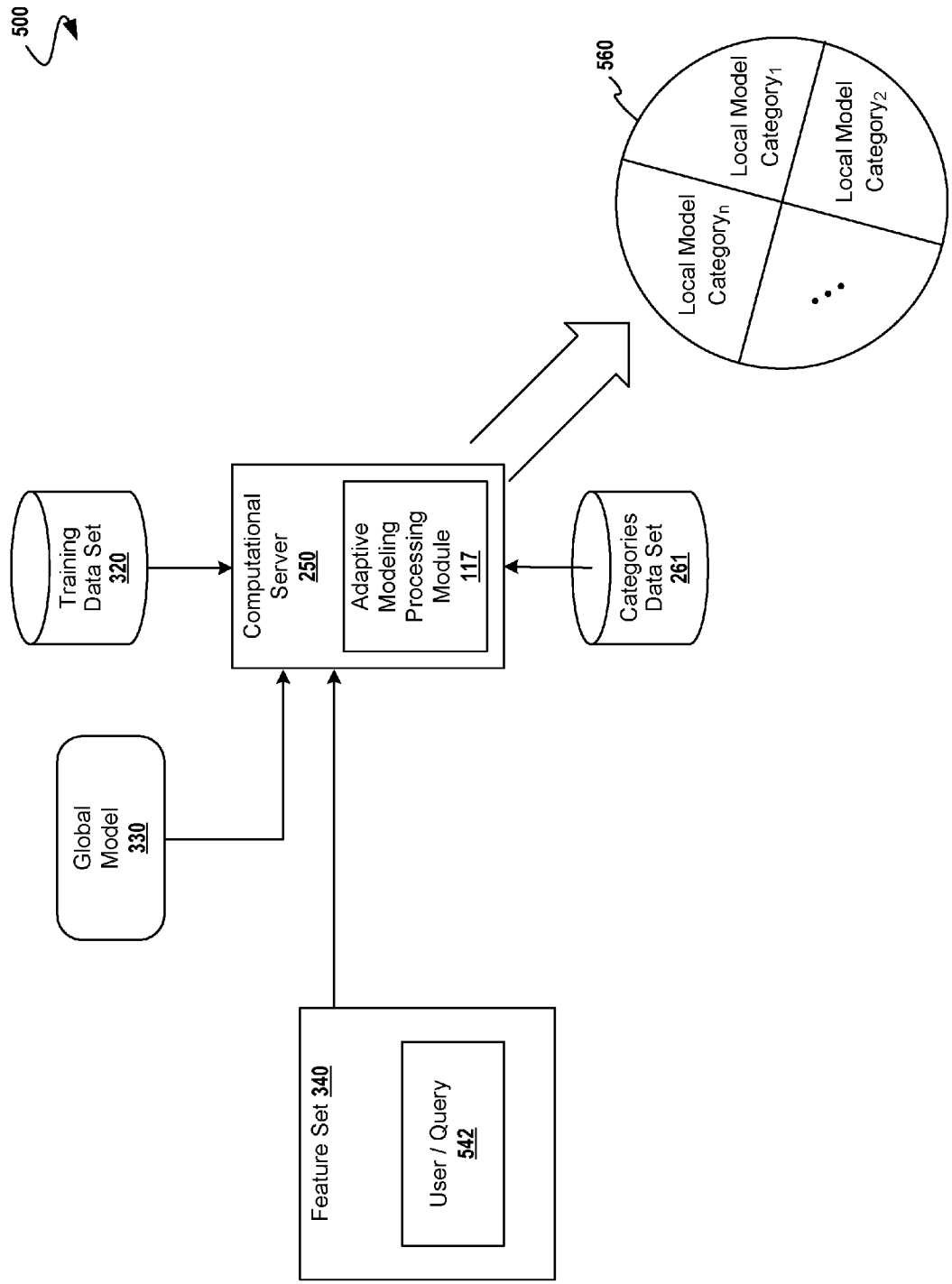
FIG. 5 depicts a block diagram illustrating a process of estimating probabilities of events in sponsored search using adaptive models using categories, according to one embodiment.

FIG. 5 depicts a block diagram illustrating a process of estimating probabilities of events in sponsored search using adaptive models using categories. As illustrated in FIG. 5, the system 500 includes an adaptive modeling processing module 117, again, coupled to a data storage 260 (as shown in FIG. 2), which data storage 260 may contain various kinds/types of data sets such as, for example, categorization data set 261.

In one embodiment, the training data set 320 may be one of the data sets stored in the data storage 260, including categories classified by query-advertisement pairs. The training data set 320 comprises a plurality of features found in a user/query 542 (e.g. from a feature set 340).

The user/query feature set may consist of n numbers of features such as, for example, User/Query Feature$_1$, User/Query Feature$_2$, User/Query Feature$_3$, ..., User/Query Feature$_n$.

Adaptive modeling processing module 117 retrieves various data/information from the data storage 260. The adaptive modeling processing module 117 retrieves a training data set 320 and its associated feature set 340 from the data storage 260. The adaptive modeling processing module 117 also retrieves the global model 330 from the global model data set 262 in the data storage 260. In the adaptive modeling processing, the collected data of the training data set of query-advertisement pairs are classified into a plurality of categories of subject matter associated with the user/query feature set. For example, classifications may be by micromarkets such as software and loans. The training data set 320 thus classified into the categories are then transmitted to local model data set 360 to train the local models. The local model data set 360 includes n numbers of local models such as, for example, Local Model Category$_1$, Local Model Category$_2$, Local Model Category$_3$, ..., Local Model Category$_n$. Each Local Model Category$_i$ is trained using each subset trained data D$_i$ and the feature set User/Query Feature$_i$.

Now, contrasting the system 300 of FIG. 3 as compared to the system 500 of FIG. 5, it may be seen that a categorization data set 261 are used in place of cluster processing module 350. Intuitively, categories may be formed by virtue of a human-defined taxonomy or hierarchy, while clusters may be formed by virtue of an observed emergence of clusters in a data set. Of course, a cluster may define the same boundary as a category, and vice-versa, depending on the data. The partitioned slices of the trained data set are then transmitted to a local model data set 560 to train the local models. As shown, the local model data set 560 includes i numbers of local models such as, for example, Local Model Category$_1$, Local Model Category$_2$, Local Model Category$_3$, ..., Local Model Category$_i$. Any one or more local models within the local model data set 560 may be stored in storage areas within a data storage 260.

Figure 6:
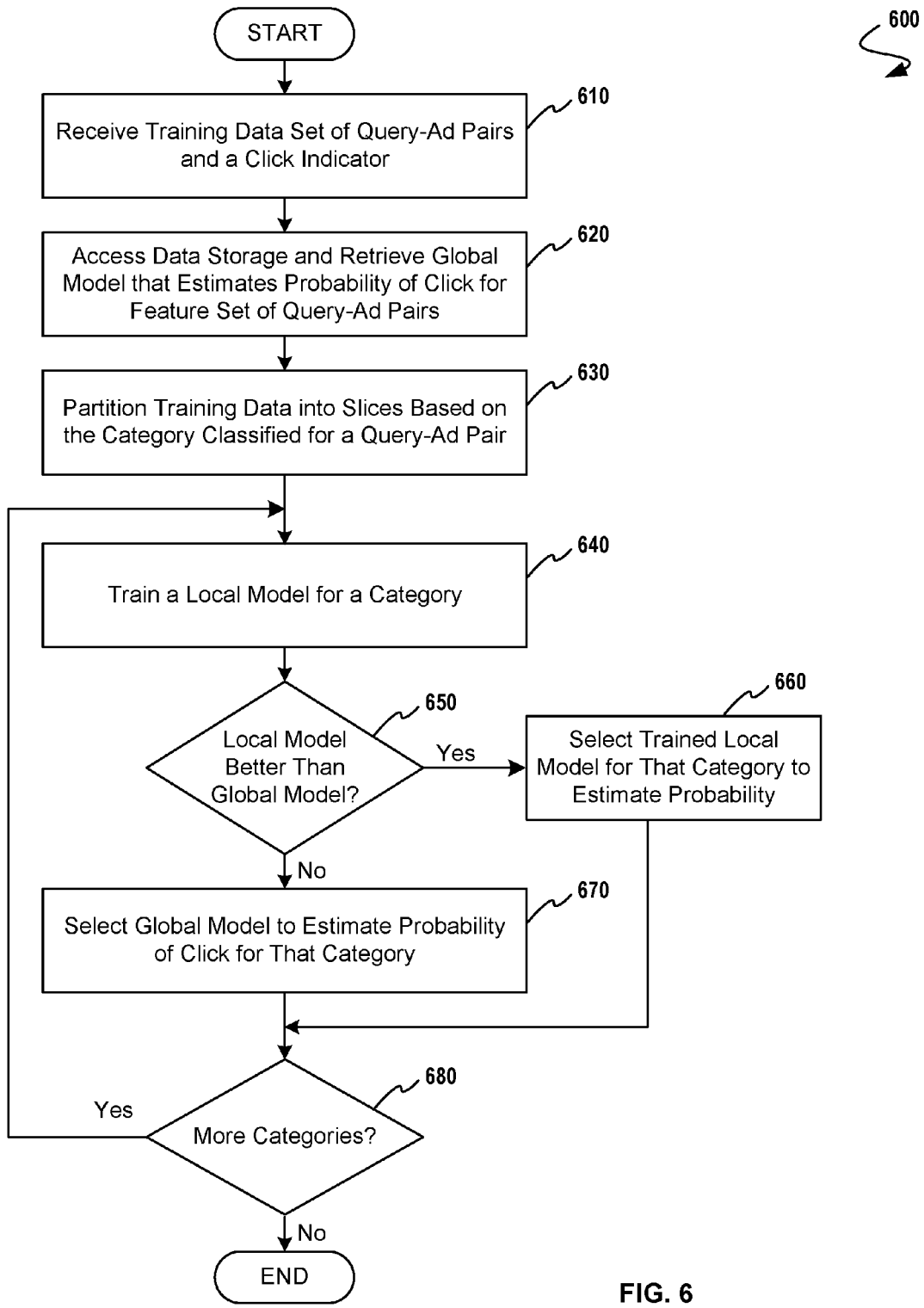
FIG. 6 depicts a flow diagram of a process for an adaptive modeling processing of query-advertisement pair using categories in the sponsored search system, according to one embodiment.

FIG. 6 depicts a flow diagram of a process for an adaptive modeling processing of query-advertisement pair using categories in the sponsored search system. As shown in FIG. 6, the system 600 receives a training data set 320 and a click indicator from the data storage which data comprises at least one feature in a user/query feature set. The training data set 320 may include, for example, query-advertisement pairs.

Then, in processing block 620, the system accesses the (adaptive modeling) data storage 260 and retrieves a global model 330 from the global model data set 262 for the training data set 320. The retrieved global model 330 is processed with the training data set 320 to estimate probability of click for the query-advertisement pairs across all categories, using the categorization data set 261.

In processing block 630, the system classifies the training data set 320 into a plurality of categories using the categorization data set 261. In this example, partitioning of the training data set into slices is performed in the form of classification of the query-advertisement pairs into categories. The categorization data set 261 may be predetermined by using a taxonomy or ontology by search engine systems (e.g. Yahoo!) and provided to be stored at the data storage 260. Classification of the training data set into categories of subject matter is then used to compare the global model and local model for each subset of the training data set to determine which of the global model and the local model is better in estimating probability of click for each subset. The classified query-advertisement pairs comprise n numbers of categories of subsets of the training data set such as, for example, $D_1$, $D_2$, $D_3$, ..., $D_n$.

The system then proceeds to processing block 640. In processing block 640, the classified trained data set associated with the feature set into categories is transmitted to the local model category data set 360 for training. The local model is trained for each one of the categories of subject matter of the training data set, starting with a subset $D_1$. The trained Local Model$_1$ for the subset $D_1$ of the training data set is then processed to estimate probability of click for the training data set.

In processing block 650, the system compares the estimates of probability of click between the global model and the trained Local Model$_1$ for the subset $D_1$ to determine whether the trained Local Model Category$_i$ is better than the global model in estimating probability of click for $D_i$. When the trained Local Model Category$_i$ is better than the global model, it proceeds to step 660, and the trained Local Model$_i$ is selected to estimate probability of click for $D_i$. On the other hand, when the system determines that the global model is better than the trained Local Model Category$_i$, it proceeds to processing block 670 and the global model is selected to estimate probability of click for $D_i$.

Once either processing block 660 or processing block 670 is complete for $D_1$, the system determines whether there are more subsets, i.e. categories, of the trained data set that have not been used to train local models. If it is determined that there are, the system goes back to processing block 640 and repeats steps between 640 and 680 for the remainders of the n numbers of categories of the training data set until all of the n numbers of the categories have been used to train local models and a model for each category is selected between the global model and the trained local model to be the better model to estimate probability of click. The better model between the global model and the local model is determined for each category of the training data set.

A Process for Combining an Adaptive Model to Select and Rank Based on Revenue

Figure 7:
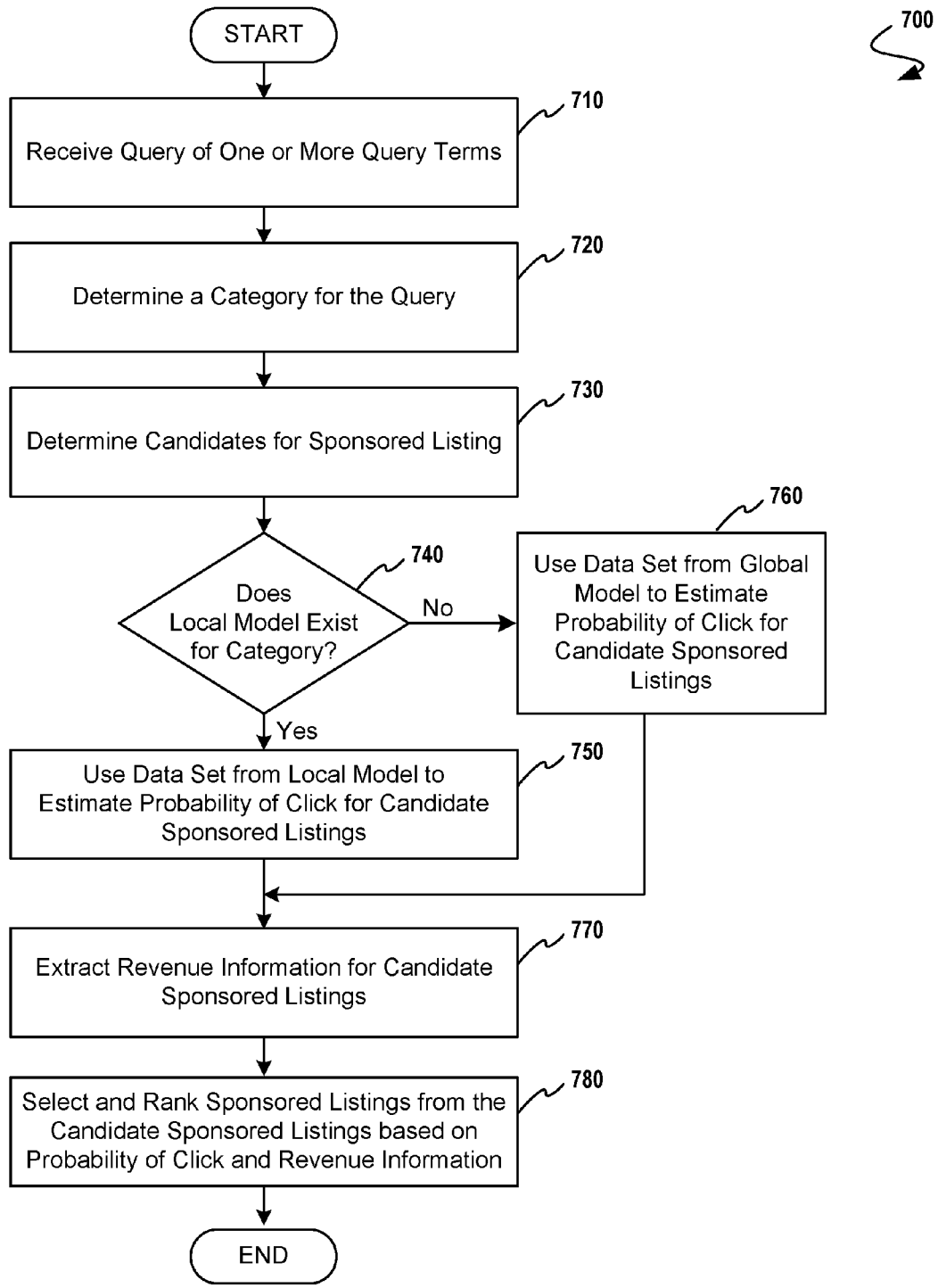
FIG. 7 depicts a flow diagram illustrating a process for selecting and ranking sponsored listings, according to one embodiment.

FIG. 7 depicts a flow diagram illustrating a process for selecting and ranking sponsored listings. As shown in FIG. 7, the selecting method receives a user query of one or query terms (see processing block 710), for example, from the client system server 105. The query of one or query terms are transmitted to the front-end server(s) 212 via the network 130. The query comprising one or query terms may include or be paired with various indications of user activities such as, for example, the user's online activity (e.g. recently visited websites, specific page views, overall click propensity, etc).

Then, in processing block 720, the system determines a category for the query received from the client system using the categorization data set 261. As discussed earlier, categories may be predetermined by using a taxonomy or ontology of the search engine systems (e.g. Yahoo!).

In processing block 730, the system determines candidate advertisements for sponsored listing based on the category determined for the query received from the client system. In some cases, a sponsored listing comprises advertisements selected based on the results of bidding by advertisers.

The system then proceeds to step 740 where it is determined whether a local model exists for the category, which determination may be made based on (at least in part) the query of processing block 720. When it is determined that a local model exists for the category determined for the query, it proceeds to processing block 750. In processing block 750, the system uses the data set from the local model that was used to train the local model to estimate probability of click for the candidate sponsored listings from processing block 730. On the other hand, when it is determined that a local model does not exist, then processing proceeds to processing block 760. In processing block 760, the system uses the data set from the global model to estimate probability of click for the candidate sponsored listings from processing block 730.

Once either processing block 750 or processing block 760 is complete in estimating probability of click for the candidate sponsored listings, the system then proceeds to processing block 770. In processing block 770, the system extracts revenue information associated with the candidate sponsored links from the candidate sponsored listings as earlier determined in processing block 730. Revenue information comprises revenue per click information (e.g. cost-per-click data) and revenue information is used in revenue optimization.

Given the information extracted from process 770, the processing proceeds to processing block 780. In processing block 780, the system selects and ranks sponsored listings from the candidate sponsored listings based on probability of click and revenue information. Candidate ads of the sponsored listings with higher probability of click are ranked higher in the listing, with revenue information also taken into account. Or, for example, a ranking (e.g. first, second, third) placement might be determined by the product of click likelihood times cost (revenue) per click.

Figure 8:
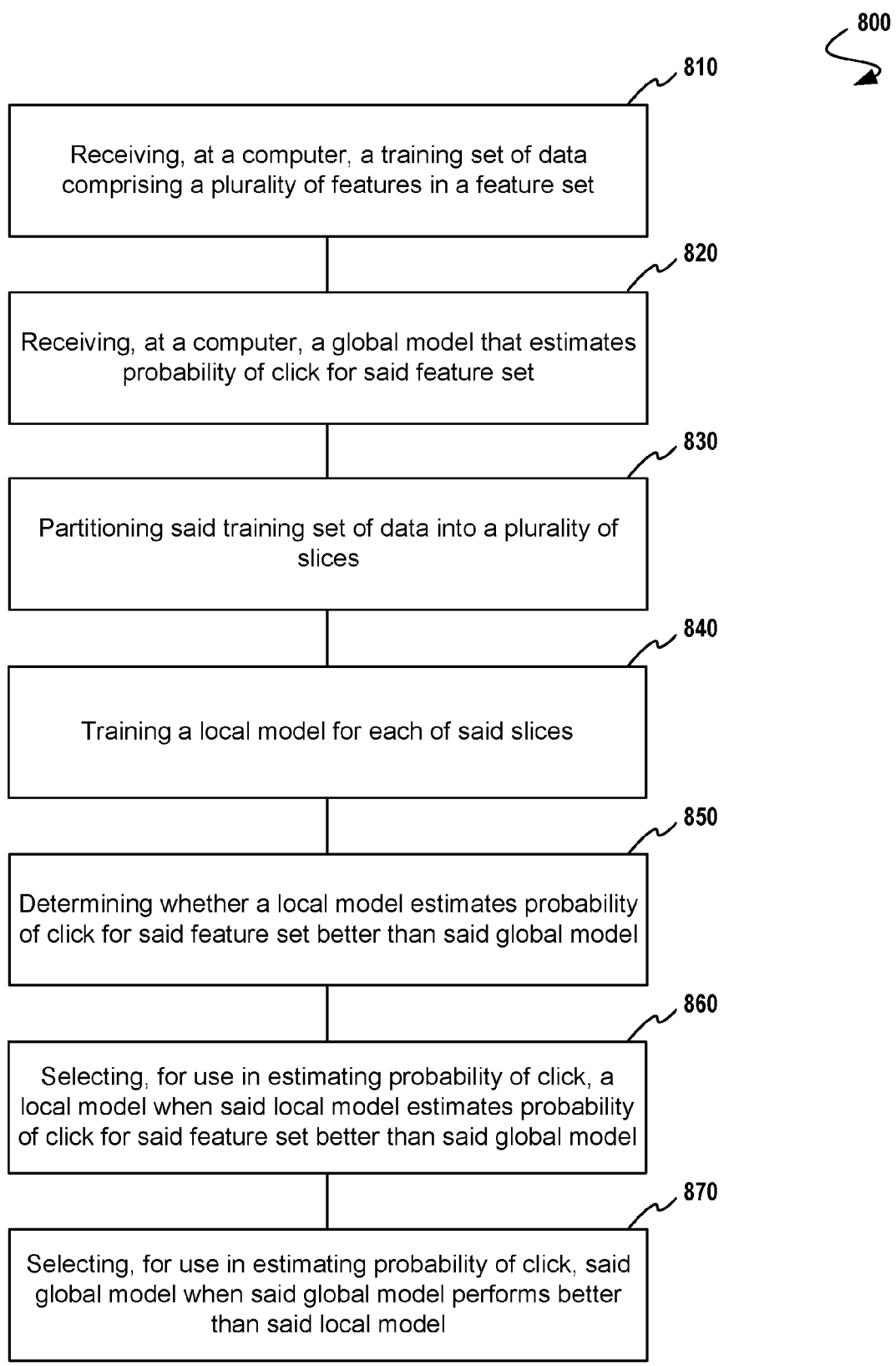
FIG. 8 depicts a block diagram of a method for estimating probability of click in an online advertising system, according to one embodiment.

FIG. 8 depicts a block diagram of a method for estimating probability of click in an online advertising system. As an option, the present method 800 may be implemented in the context of the architecture and functionality of the embodiments described herein. Of course, however, the method 800 or any operation therein may be carried out in any desired environment. The operations of the method can, individually or in combination, perform steps within method 800. Any steps performed within method 800 may be performed in any order unless as may be specified in the claims. As shown, method 800 implements a method for estimating probability of click in an online advertising method, the method 800 comprising operations for: receiving, at a computer, a training set of data (e.g. training data set 320) comprising a plurality of features in a feature set 340 (see operation 810); receiving, at a computer, a global model (e.g. global model 330) that estimates probability of click for the feature set (see operation 820); processing, in a computer, the global model and the feature set by partitioning the training set of data into a plurality of slices (see operation 830); training a local model for each of the slices (see operation 840); determining whether a local model estimates probability of click for the feature set better than the global model (see operation 850); selecting, for use in estimating probability of click, a local model when the local model estimates probability of click for the feature set better than the global model (see operation 860); and selecting, for use in estimating probability of click, the global model when the global model performs better than the local model (see operation 870). In some embodiments, the feature set comprises a feature vector for a plurality of query-advertisement pairs and a binary indicator that represents a click or non-click for the query-advertisement pair. Moreover, some methods use categories (e.g. categories 550) of subject matter for processing the query-advertisement pairs. Still other embodiments implement processing for selecting a combination of the global model and a local model, wherein estimating probability of click comprises a uniform average of the global model and the local model.

In some embodiments the processing in a computer further comprises initializing the local model using flat initialization. In some embodiments, the processing in a computer further comprises initializing the local model using parameters of the global model. The method 800 may perform processing in a computer by partitioning the training set of data into a plurality of slices, which processing might include generating a plurality of clusters from the training data; and partitioning the training set of data into a plurality of slices based on the clusters.

Figure 9:
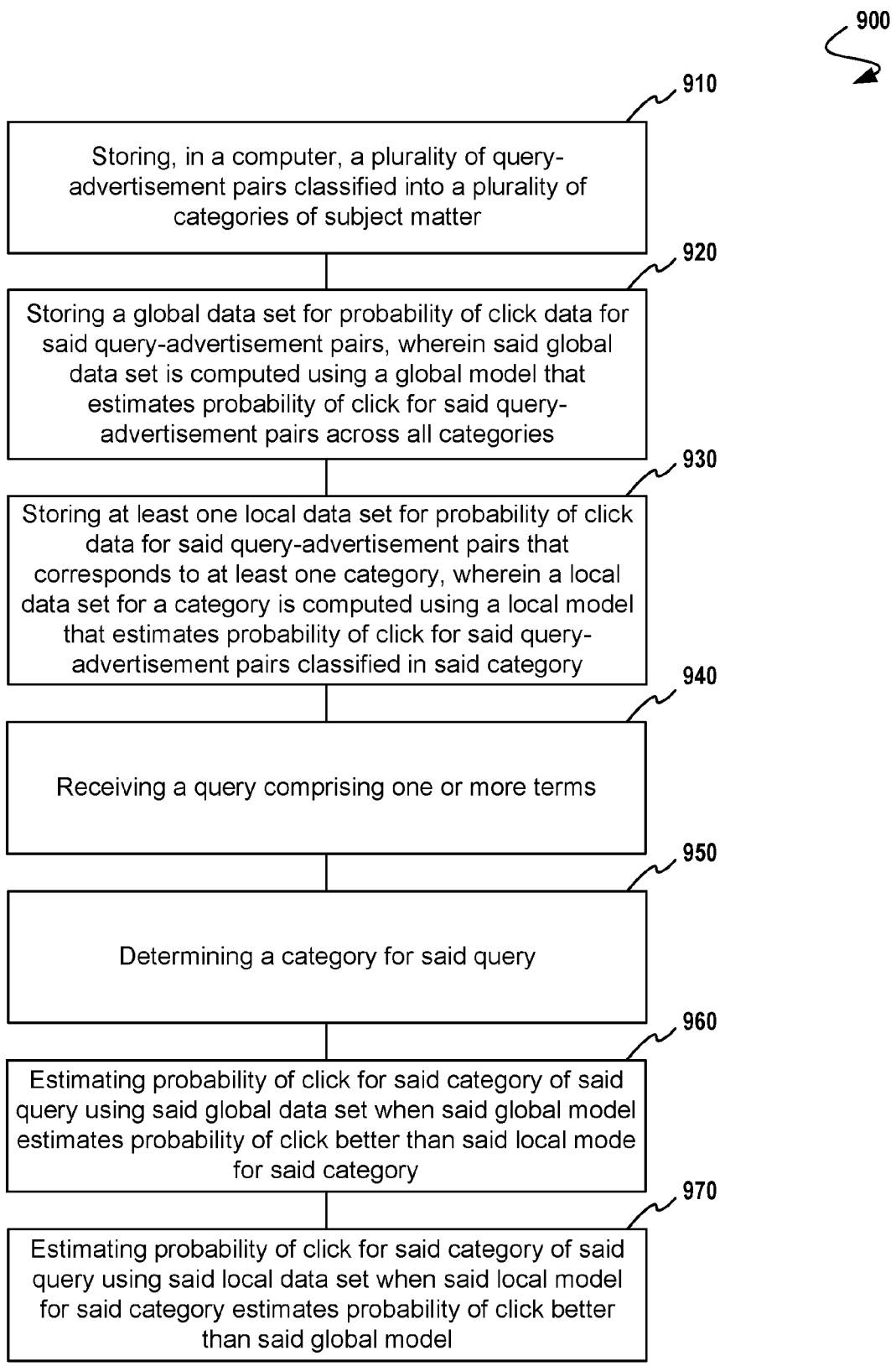
FIG. 9 depicts a block diagram of a method for estimating probability of click in a sponsored search system, according to one embodiment.

FIG. 9 depicts a block diagram of a method for estimating probability of click in a sponsored search system. As an option, the present method 900 may be implemented in the context of the architecture and functionality of the embodiments described herein. Of course, however, the method 900 or any operation therein may be carried out in any desired environment. The operations of the method can, individually or in combination, perform method steps within method 900. Any method steps performed within method 900 may be performed in any order unless as may be specified in the claims. As shown, method 900 implements a method for estimating probability of click in a sponsored search method, the method 900 comprising operations for: storing, in a computer, a plurality of query-advertisement pairs classified into a plurality of categories of subject matter (see operation 910); storing a global data set for probability of click data for the query-advertisement pairs, wherein the global data set is computed using a global model that estimates probability of click for the query-advertisement pairs across all categories (see operation 920); storing at least one local data set for probability of click data for the query-advertisement pairs that corresponds to at least one category, wherein a local data set for a category is computed using a local model that estimates probability of click for the query-advertisement pairs classified in the category (see operation 930); processing, in a computer, to estimate probability of click by receiving a query comprising one or more terms (see operation 940); determining a category for the query (see operation 950); estimating probability of click for the category of the query using the global data set when the global model estimates probability of click better than the local mode for the category (see operation 960); and estimating probability of click for the category of the query using the local data set when the local model for the category estimates probability of click better than the global model (see operation 970).

Figure 10:
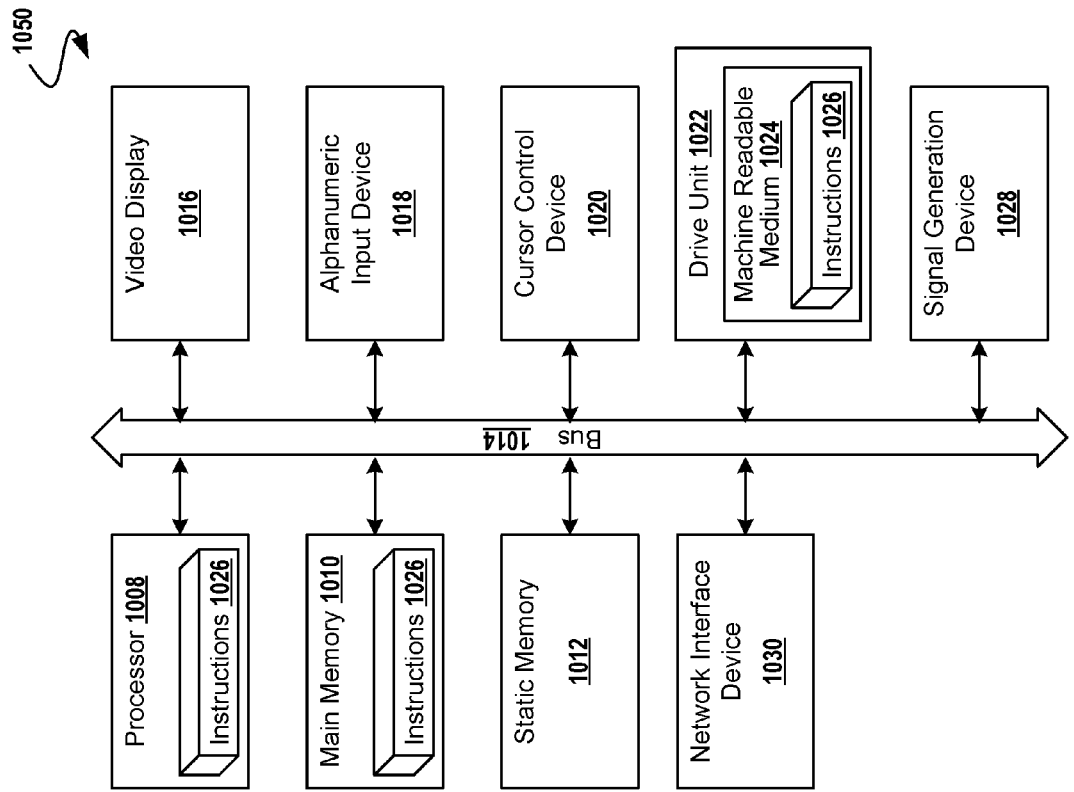
FIG. 10 is a diagrammatic representation of a network including nodes for client computer systems, nodes for server computer systems, and nodes for network infrastructure, according to one embodiment.
Figure 10:
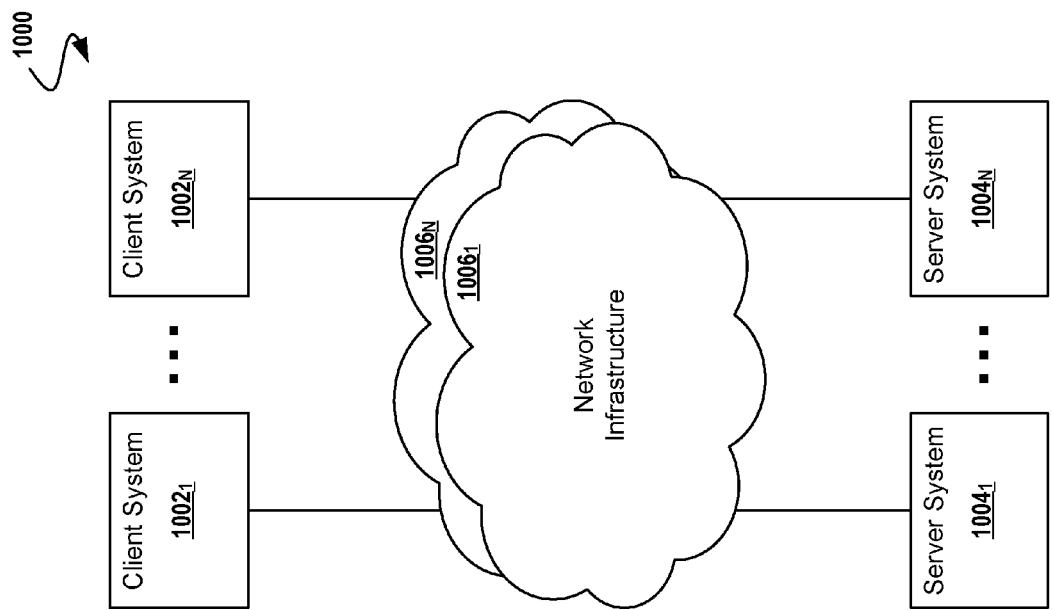

FIG. 10 is a diagrammatic representation of a network 1000, including nodes for client computer systems $1002_1$ through $1002_N$, nodes for server computer systems $1004_1$ through $1004_N$, nodes for network infrastructure $1006_1$ through $1006_N$, any of which nodes may comprise a machine 1050 within which a set of instructions for causing the machine to perform any one of the techniques discussed above may be executed. The embodiment shown is purely exemplary, and might be implemented in the context of one or more of the figures herein.

Any node of the network 1000 may comprise a general-purpose processor, a digital signal processor (DSP), an application specific integrated circuit (ASIC), a field programmable gate array (FPGA) or other programmable logic device, discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g. a combination of a DSP and a microprocessor, a plurality of microprocessors, one or more microprocessors in conjunction with a DSP core, or any other such configuration, etc).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g. a client computer system, a server computer system) and/or may comprise one or more embedded computer systems, a massively parallel computer system, and/or a cloud computer system.

The computer system 1050 includes a processor 1008 (e.g. a processor core, a microprocessor, a computing device, etc), a main memory 1010 and a static memory 1012, which communicate with each other via a bus 1014. The machine 1050 may further include a computer display unit 1016 that may comprise a touch-screen, or a liquid crystal display (LCD), or a light emitting diode (LED) display, or a cathode ray tube (CRT). As shown, the computer system 1050 also includes a human input/output (I/O) device 1018 (e.g. a keyboard, an alphanumeric keypad, etc), a pointing device 1020 (e.g. a mouse, a touch screen, etc), a drive unit 1022 (e.g. a disk drive unit, a CD/DVD drive, a tangible computer readable removable media drive, an SSD storage device, etc), a signal generation device 1028 (e.g. a speaker, an audio output, etc), and a network interface device 1030 (e.g. an Ethernet interface, a wired network interface, a wireless network interface, a propagated signal interface, etc).

The drive unit 1022 includes a machine-readable medium 1024 on which is stored a set of instructions (i.e. software, firmware, middleware, etc) 1026 embodying any one, or all, of the methodologies described above. The set of instructions 1026 is also shown to reside, completely or at least partially, within the main memory 1010 and/or within the processor 1008. The set of instructions 1026 may further be transmitted or received via the network interface device 1030 over the network bus 1014.

It is to be understood that embodiments of this invention may be used as, or to support, a set of instructions executed upon some form of processing core (such as the CPU of a computer) or otherwise implemented or realized upon or within a machine- or computer-readable medium. A machine-readable medium includes any mechanism for storing or transmitting information in a form readable by a machine (e.g. a computer). For example, a machine-readable medium includes read-only memory (ROM); random access memory (RAM); magnetic disk storage media; optical storage media; flash memory devices; electrical, optical or acoustical or any other type of media suitable for storing information.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A computer-implemented method for estimating probability of click in an online advertising system, said method comprising:
    receiving, at a computer, a training set of data comprising a plurality of features in a feature set;
    receiving, at a computer, a global model that estimates probability of click for said feature set;
    processing, in a computer, said global model and said feature set by:
        partitioning said training set of data into a plurality of slices;
        training a local model for each of said slices to generate a plurality of trained local models;
        determining whether each of said trained local models estimates probability of click for said feature set better than said global model;
        selecting, for use in estimating probability of click, a local model from said trained local models when said local model estimates probability of click for said feature set better than said global model; and
        selecting, for use in estimating probability of click, said global model when said global model performs better than said local model.

2. The method as set forth in claim 1, wherein said feature set comprises a feature vector for a plurality of query-advertisement pairs and a binary indicator that represents a click or non-click for said query-advertisement pair.

3. The method as set forth in claim 2, wherein said slices comprise categories of subject matter for said query-advertisement pairs.

4. The method as set forth in claim 1, wherein said processing in a computer further comprises selecting, for use in estimating probability of click, a combination of said global model and at least one local model of said trained local models, wherein estimating probability of click comprises a uniform average of said global model and said local model.

5. The method as set forth in claim 1, wherein said processing in a computer further comprises initializing said local model using flat initialization.

6. The method as set forth in claim 1, wherein said processing in a computer further comprises initializing said local model using parameters of said global model.

7. The method as set forth in claim 1, wherein said processing in a computer by partitioning said training set of data into a plurality of slices further comprises:
generating a plurality of clusters from said training data; and
partitioning said training set of data into a plurality of slices based on said clusters.

8. A computer-implemented method for estimating probability of click in a sponsored search system, said method comprising:
storing, in a computer, a plurality of query-advertisement pairs classified into a plurality of categories of subject matter;
storing a global data set for probability of click data for said query-advertisement pairs, wherein said global data set is computed using a global model that estimates probability of click for said query-advertisement pairs across all categories;
storing at least one local data set, a subset of said global data set, for probability of click data for said query-advertisement pairs that corresponds to at least one category, wherein a local data set for a category is computed using a local model that estimates probability of click for said query-advertisement pairs classified in said category;
processing, in a computer, to estimate probability of click by:
receiving a query comprising one or more terms;
determining a category for said query;
estimating probability of click for said category of said query using said global data set when said global model estimates probability of click better than said local mode for said category; and
estimating probability of click for said category of said query using said local data set when said local model for said category estimates probability of click better than said global model.

9. The method as set forth in claim 8, further comprising selecting at least one sponsored link in response to said query comprises:
storing information about revenue associated with a plurality of candidate sponsored links; and
selecting, at least one of said sponsored links from said candidate sponsored links based on said probability of click estimated for said query and information about revenue associated with said candidate sponsored links.

10. A computer readable medium comprising a set of instructions which, when executed by a computer, cause the computer to estimate probability of click in an online advertising system, said instructions for:
receiving, at a computer, a training set of data comprising a plurality of features in a feature set;
receiving, at a computer, a global model that estimates probability of click for said feature set;
processing, in a computer, said global model and said feature set by:
partitioning said training set of data into a plurality of slices;
training a local model for each of said slices to generate a plurality of trained local models;
determining whether each of said trained local model estimates probability of click for said feature set better than said global model;
selecting, for use in estimating probability of click, a local model from said trained local models when said local model estimates probability of click for said feature set better than said global model; and
selecting, for use in estimating probability of click, said global model when said global model performs better than said local model.

11. The computer readable medium as set forth in claim 10, wherein said feature set comprises a feature vector for a plurality of query-advertisement pairs and a binary indicator that represents a click or non-click for said query-advertisement pair.

12. The computer readable medium as set forth in claim 11, wherein said slices comprise categories of subject matter for said query-advertisement pairs.

13. The computer readable medium as set forth in claim 10, wherein said processing in a computer further comprises instructions for selecting, for use in estimating probability of click, a combination of said global model and at least one local model of said trained local models, wherein estimating probability of click comprises a uniform average of said global model and said local model.

14. The computer readable medium as set forth in claim 10, wherein said processing in a computer further comprises instructions for initializing said local model using flat initialization.

15. The computer readable medium as set forth in claim 10, wherein said processing in a computer further comprises instructions for initializing said local model using parameters of said global model.

16. A system for estimating probability of click in an online advertising system, said system comprising:
at least one data storage module; and
a server, comprising a processor and memory, coupled to said data storage modules, for receiving a training set of data comprising a plurality of features in a feature set, for receiving a global model that estimates probability of click for said feature set, and processing said global model and said feature set by:
partitioning said training set of data into a plurality of slices;
training a local model for each of said slices to generate a plurality of trained local models;
determining whether each of said trained local model estimates probability of click for said feature set better than said global model;
selecting, for use in estimating probability of click, a local model from said trained local models when said local model estimates probability of click for said feature set better than said global model; and
selecting, for use in estimating probability of click, said global model when said global model performs better than said local model.

17. The system as set forth in claim 16, wherein said feature set comprises a feature vector for a plurality of query-advertisement pairs and a binary indicator that represents a click or non-click for said query-advertisement pair.

18. The system as set forth in claim 17, wherein said slices comprise categories of subject matter for said query-advertisement pairs.

19. The system as set forth in claim 16, said server for processing further comprises selecting, for use in estimating probability of click, a combination of said global model and at least one local model, wherein estimating probability of click comprises a uniform average of said global model and said local model.

20. The system as set forth in claim 16, wherein said processing further comprises initializing said local model using flat initialization.

21. The system as set forth in claim 16, wherein said processing further comprises initializing said local model using parameters of said global model.

22. The system as set forth in claim 16, wherein said processing by partitioning said training set of data into a plurality of slices further for:
    generating a plurality of clusters from said training data; and
    partitioning said training set of data into a plurality of slices based on said clusters.

* * * * *